May 3, 1966     J. E. BIGELOW     3,249,691
WIDE DENSITY RANGE FILM ILLUMINATOR
Filed Oct. 14, 1963
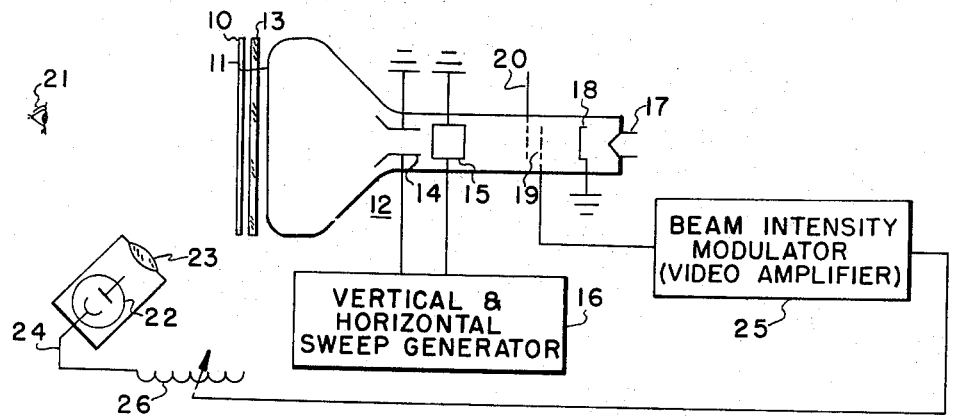
FIG. 1
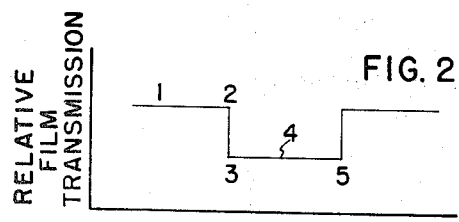
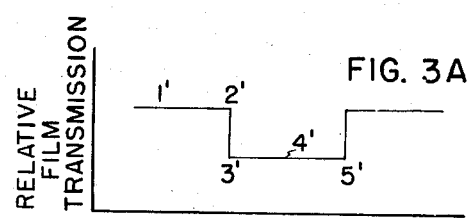
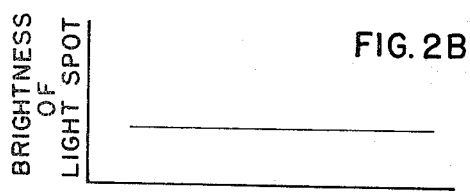
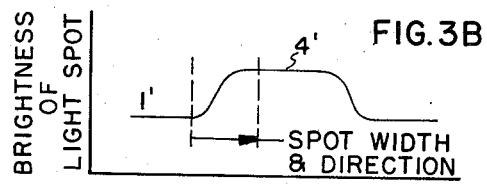
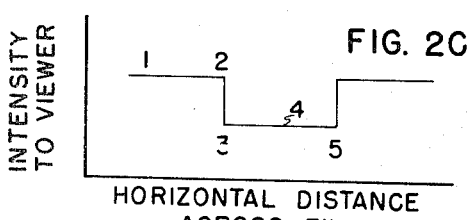
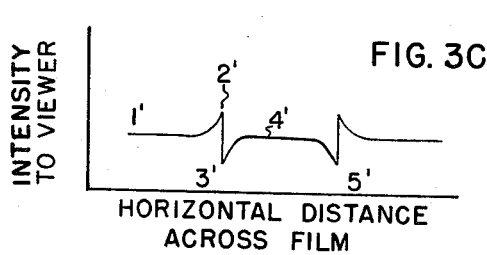
INVENTOR.
JOHN E. BIGELOW
BY
*Ralph D. Hohenfeldt*
ATTORNEY United States Patent Office 3,249,691
Patented May 3, 1966

3,249,691
WIDE DENSITY RANGE FILM ILLUMINATOR
John E. Bigelow, Hales Corners, Wis., assignor to General
Electric Company, a corporation of New York
Filed Oct. 14, 1963, Ser. No. 315,921
4 Claims. (Cl. 178—6.8)

The invention is a new article of manufacture for reading film transparencies and it is particularly useful for analyzing radiographs for all the information they contain.

Radiologists have studied radiographs traditionally by placing them on the light diffusing glass window of a box that contains an intense, uniform light source. Information about the subject of the radiograph is obtained by the radiologist through interpretation of density gradations of the film. During this procedure, the observer's eyes adjust to the integrated or average light intensity so that it is difficult to perceive detail in both excessively bright and excessively dark areas. To minimize this effect, the exposure factors for the X-ray or other radiation source are selected to produce a film in which all important detail is compressed within a density range of 0.35 to 2.7.

However, in some regions of the human body there are wide density variations, such as between tissue and bone, which if taken on the same film, make wide density variations or glare effect almost inescapable.

At high average light intensity, the eye has good intensity discrimination; that is, it can perceive contrast and derive information between adjacent areas that differ in brightness by one or two percent. When dark or low intensity regions on the film are accompanied by bright or high intensity regions, the eye adjusts to the integrated or average brightness and it is found that the difference in brightness for contrast perception may need to be in the range of 30 to 50 percent. Hence, perception is not as acute and viewing is very uncomfortable to the observer.

To overcome the above noted difficulties, the present invention contemplates selectively reducing the intensity of the viewing light source in the low density regions of the film and increasing the intensity of the light source in the high density regions of the film. The purpose is to present the observed image with lesser variations in brightness over extended regions without adversely affecting useful contrast between small details, as will be explained later. In the general case, the invention employs a beam of light that is projected onto the back of the film and is scanned over the film at such rate as to produce the illusion that the film is illuminated constantly. The light source may be any that allows its intensity to be modulated essentially instantaneously and inversely with the intensity of the light that is transmitted through incremental areas of the film. Oscillating mirrors which reflect a beam of light that is subject to modulation are one way of carrying out the principles of the invention. Another is to use a scanning disk in which there is a helical array of holes through which a modulatable light beam projects so as to produce a raster on the film.

A preferred embodiment of the invention, however, is characterized by placing the film on or in line with the phosphorescent face plate of a cathode ray tube the electron beam of which is swept so that the light spot produced thereby forms a raster that illuminates the film from the side opposite the observer. A photosensor is located for viewing the film in the same manner that the observer sees it. The photosensor is adapted to feedback a control signal which increases the brightness of the spot when it coincides with the high density area of the film and reduces the brightness of the spot in the low density areas. Zones of varying density within the area of the beam spot do not result in a modulating feedback signal.

The new film viewer utilizes some features of known photographic film printers of the type that modulate a scanned light spot to control contrast differences of a negative, that is being printed, to within the light sensitivity range of the photographic printing paper that is being used. In so far as is known, however, this concept has not heretofore been adapted for direct viewing of a radiographic film by a radiologist. Direct viewing permits the radiologist to view in the manner to which he is accustomed and to fully utilize interpretive capabilities that he has developed to a high degree of perfection in connection with using the old light box type film illuminator with a distributed fixed intensity light source. A significant advantage of the direct film viewer as compared to photographic printers is that there is no chance for loss of information that inevitably occurs in connection with the additional step of printing.

A preferred embodiment of the invention will now be described in connection with the accompanying drawing in which:

FIGURE 1 is a diagrammatic representation of the invention for viewing film transparencies;

FIGURES 2A–2C shows the relationship between transmission of the film, brightness of the scanned light spot, and intensity observed by the viewer, respectively, plotted against horizontal distance across the film in an example of viewing without the modulated light source; and, FIGURES 3A–3C show the same relationships when a film is viewed with an illuminator that employs the modulated light source concept of the present invention.

In FIGURE 1 the transparent film 10, that bears the shadow image to be studied, is placed in front of the phosphorescent face plate 11 of a cathode ray tube or kinescope 12. The film 10 may be placed directly on face plate 11 and held there by suitable clips, not shown, or for reasons which will be given later, a ground glass plate 13 may be interposed between face plate 11 and film 10. Tube 12 is constructed substantially the same as the ordinary television picture tube except that the phosphor which is deposited on the inside of face plate 11 is preferably one that has very short afterglow. A phosphor with desirable afterglow and brightness characteristics is one that is composed of 50 percent each of P–20 and P–16 phosphors.

In this illustration, tube 12 is scanned electrostatically by means of vertical deflection plates 14 and horizontal deflection plates 15 which may be energized by any suitable vertical and horizontal sweep generator combination such as that symbolized by the box bearing the reference numeral 16. The electron beam which forms the raster on face plate 11 may be swept at the customary television rates; that is, the vertical deflection frequency may be 60 cycles per second and the horizontal deflection frequency may be 15,750 cycles per second. This produces 60 fields per second and if they are interlaced in the usual way, two fields will produce a frame that endures for 1/30 of a second. The number of horizontal lines in the raster will then equal 525. Other scan rates may also be employed provided they are high enough to move the spot at such rate that the eye does not perceive its movement. Electromagnetic deflection may be substituted for electrostatic deflection if desired.

Kinescope 12 may be provided with any suitable electron gun although a preferable form for the purposes of the invention is one that permits defocusing of its beam so as to create a large area light spot on phosphorescent screen of the tube. In the illustrated kinescope, there is a cathode heater 17 and an electron emitter 18 which is shown as being at ground potential. The focusing and accelerating electrodes of the gun are omitted for the sake of brevity. A grid 19 is provided, however, as in the kinescope, for controlling contrast. Brightness, or mean beam intensity is controlled by a grid 20 which may be supplied from a controllable bias voltage source, not shown. Thus, the mean intensity of the electron beam may be controlled by varying the potential on grid 20 and the beam intensity may be modulated above and below the mean by varying voltage on contrast control grid 19.

As suggested, a requirement of the invention is that the light spot which is scanned across the back of the film be of larger diameter than that ordinarily used in a television picture tube. One way of achieving this is to defocus the electron beam and another is to diffuse a sharply focused beam by interposing a ground glass plate 13 or other diffuser between the kinescope and film. The light spot diameter on the film may be in the range of $\frac{1}{30}$ of an inch to 2 inches but it is usually preferable to be at 1 inch or below. An effective light spot on the film of about $\frac{1}{2}$ inch yields goods results with the radiographs most commonly encountered.

When the invention is in use, the observer's eyes 21 are positioned for looking directly at the plate of the film 10 as shown in FIGURE 1. If the brightness of the flying light spot were held constant, the observed effect would be the same as with light box film illuminators. Low density areas of the film would appear bright and high density areas would appear dark with a resulting obscuring of detail over the entire film. In accordance with the invention, however, the light spot is relatively large and is electronically modulated to reduce its brightness in low density regions of the film and to increase its brightness in high density regions. This is accomplished through the agency of a photoelectric monitor 22 that is located for observing the same average brightness that is seen by the observer's eyes. The monitor responds to instantaneous changes in light intensity and provides an inverse feedback signal for intensity modulation or contrast control which tends to hold brightness constant for every part of the film that may be illuminated at any instant. The image on the film may be projected on the photoelectric monitor 22 by a lens 23 for example. The power supply for monitor 22 is not shown. The monitor tube produces an output signal voltage that appears on a conductor 24 which feeds through an attenuator 26 and serves as an input to a beam intensity modulator which is essentially a video amplifier 25. The output of amplifier 25 is applied to grid 19 in kinescope 12. The feedback is negative. When the monitor observes low light intensity, the polarity of its amplified signal is such as to apply a voltage to grid 19 that increases electron beam intensity, and accordingly, the brightness of the spot. If the instantaneous position of the spot coincides with a low density area in the film at a given instant, the monitor 22 observes above average brightness in which case its negative feedback brings about a diminution of brightness. The amount of light spot modulation may be individualized to the observer's viewing habits and to the contrast characteristic of the particular film being viewed by adjustment of attenuator 26.

Photosensor 22 is preferably one that has a fast response characteristic such as an RCA 931 photomultiplier tube. In an actual embodiment of the invention, a second photomultiplier tube, not shown, is used. It is arranged for looking downwardly at an angle toward film 10 or with an opposite angular orientation to that of photomultiplier tube 22. The output of the photomultipliers may be in parallel and fed into amplifier 25 to produce a common output signal which is applied to contrast control grid 19. Using two photosensors has the advantage of a higher signal level and results in better correspondence between the light sensed by the eye and the photosensors.

For films with the most commonly encountered contrast differences and density levels, it has been found that a phosphorescent screen with an average brightness level of about 420 foot-lamberts gives satisfactory results. For a spot size range of $\frac{1}{30}$ to $\frac{1}{2}$ of an inch, this amounts to a brightness of $0.5 \times 10^6$ to $100 \times 10^6$ foot-lamberts over the area of the spot.

The principles and advantages of the invention may be elucidated by considering FIGURE 2, which shows what occurs when a light beam is unmodulated, equivalent to prior art illuminators, and FIGURE 3 which shows what occurs when a light beam of proper size is modulated in accordance with the invention. In FIGURE 2A, film transmission on an arbitrary scale is plotted against distance across a horizontal line or scan width for a selected high transmission region adjacent a dense or low transmission band. Assume that an unmodulated light spot of any size is moving from left to right so as to pass from the thin to the thick film area over the boundary line 2–3. In the region 1, transmission is high and at the edge 2 of the dark band it drops to a lower level 3 and rises again at 5 when the light spot emerges. FIGURE 2B shows that the brightness of the spot remains constant. If the ordinates of 2A are multiplied by the corresponding ordinates in 2B, the result is a plot like 2C which demonstrates that the transmitted intensity to the viewer for any given region is proportionate to the film density in that region. Since the eye adjusts to average brightness, it is apparent that there would be no enhancement of contrast perception for poorly contrasted detail within the dark band or within the adjacent relatively lighter region.

FIGURE 3 shows what occurs when the same film region is being examined with a modulated light source in accordance with the invention. FIGURE 3A illustrates how transmission would drop in the dark band of the film. Now, however, the large light spot is moving from left to right and is varying in brightness inversely with the amount of light that the film would transmit in the region of interest as seen in FIGURE 3B. In this instance, it is seen that as a leading edge of the spot starts to enter the dark region on the abscissa 2'–3' in FIGURE 3A, the trailing part of the light spot is already manifesting an increase in brightness due to negative feedback as evidenced by the brightness curve beginning to rise at the left of the vertical dashed line in FIGURE 3B. If the light spot were very small or not diffused, the shape of the brightness curve would be more abrupt at the transition lines, and although its brightness would increase in the large area dense regions, changes in contrast in the dense regions would not be observed. However, as the large spot progresses completely into the dark region the whole area of the spot increases to maximum brightness. Hence, the large area is brought to a new level of brightness which permits preservation of details the contrast of which would normally not be observable. It is thus seen that compensation for brightness vanishes over areas smaller than the light spot.

FIGURE 3C shows a plot of the light intensity seen by the viewer. This plot results in multiplying the corresponding ordinates of 3A and 3B together. In 3C it is seen that at thin region of the film 2', there is a zone of slightly higher observed brightness while just inside the dense regions, brightness is a little below average. In the major part of the dark band region, the ordinate or brightness level marked 4' is essentially equal in magnitude with the ordinate or region marked 1' that pertains to a thin, low density region of the film. Thus, it is seen that negative feedback raises brightness in the dark regions like 4' and holds brightness relatively constant in the light regions like 1' to better bring out details that would normally be obscured.

In an actual embodiment, the kinescope and electronic components are mounted in a console, not shown, that looks somewhat like a television set. A light shield or canopy, not shown, is located to shield the film from the ambient room light. Aside from an on-off switch, there are only two controls. One is a contrast range control 26 and another is a brightness control which governs average brightness by varying the voltage on grid 20.

The new film viewer markedly increases the amount of information that a radiologist can derive from a radiograph. It is now possible to perceive detail in high film density zones that cannot be seen when a film is viewed with a conventional, fixed brightness viewer. The radiologist no longer experiences the eye discomfort that accompanies trying to distinguish details in dense areas that are adjacent to bright areas.

Although a preferred embodiment of the invention has been discussed in considerable detail, such description is to be considered illustrative rather than limiting, for the invention may be variously embodied as will now be recognized by those skilled in the art. Accordingly, the spirit and scope of the invention is to be governed only by the claims which follow.

It is claimed:

1. A new article of manufacture for viewing directly the image on a film transparency comprising:
   (a) means for generating a light spot that impinges on the film on its side opposite from the observer,
   (b) means for causing said light spot to scan the area of the film,
   (c) means for sensing the instantaneous brightness of the film over the area of the spot, which sensing means produces a control signal, and
   (d) means that are responsive to the control signal to modulate the light generating means inversely with respect to the instantaneous brightness of the spot,
   (e) whereby the average brightness that is perceived by the observer's eye may be controlled at a preselected level.

2. A new article of manufacture for viewing directly the image on a film transparency comprising:
   (a) a cathode ray tube including a face plate having a phosphorescent coating on one side,
   (b) means for producing an electron beam in the tube, which beam impinges on the coating to produce a light spot,
   (c) means for scanning the beam in a raster over the area of the face plate at least as large as the area of interest in a film transparency the plane of which is substantially parallel with the face plate,
   (d) a light intensity sensing device that is positioned to receive light from the spot after it passes through the film and to produce an electric signal whose magnitude is proportional to the density of the film in alignment with the instantaneous location of the spot, and
   (e) a control element in the tube to which element said electric signal is applied to modulate the intensity of the beam inversely with respect to the brightness of the spot, whereby the apparent illumination of the film is held substantially uniform.

3. The invention set forth in claim 2 including:
   (a) a planar light diffusing element interposed between the face plate and the plane of the film.

4. The invention set forth in claim 2 wherein:
   (a) said light spot diameter is in the range of 1/30 of an inch to 2 inches.

References Cited by the Examiner

UNITED STATES PATENTS

| 2,480,425 | 8/1949 | Simmon | 178—6.8 X |
| 3,183,766 | 5/1965 | Takasaka | 178—7.3 |

References Cited by the Applicant

UNITED STATES PATENTS

| 2,755,585 | 7/1956 | Lubow. |
| 2,804,498 | 8/1957 | Theile. |
| 2,842,025 | 7/1958 | Craig. |
| 2,921,512 | 1/1960 | Craig. |

OTHER REFERENCES

E. Zieler and K. Westerkowsky: The Ampliscope, An Experimental Apparatus for "Harmonizing X-Ray Images," The Philips Technical Review, issue No. 9 of volume 24, 1962–63, p. 285.

DAVID G. REDINBAUGH, *Primary Examiner.*

R. L. RICHARDSON, *Assistant Examiner.*